US000001370H

United States Statutory Invention Registration [19]

[11] Reg. Number: H1370

[43] Published: Nov. 1, 1994

Wolch et al.

[54] INTERFEROMETRIC VIBRATION AND THERMAL EXPANSION COMPENSATOR

[75] Inventors: John D. Wolch, Versailles; William J. Stachnik, Griswold, both of Conn.

[73] Assignee: The United States of America as represented by the Secretary of the Navy, Washington, D.C.

[21] Appl. No.: 691,071

[22] Filed: Apr. 15, 1991

[51] Int. Cl.[5] ..... G01N 21/41

[52] U.S. Cl. ..... 356/361; 356/130

[58] Field of Search ..... 356/361, 130

[56] References Cited

U.S. PATENT DOCUMENTS 4,640,615 2/1987 Sasaki ..... 356/361

*Primary Examiner*—Bernarr E. Gregory
*Attorney, Agent, or Firm*—Michael J. McGowan; Prithvi C. Lall

[57] ABSTRACT

A refractive index variability measuring system using a configuration of optical interferometers, mirrors, windows and receivers is desirable. The system provides an improved and a distinctive method for vibration and thermal expansion cancellation. Additionally, an improved matching of optical paths by using this system allows for growth of several measurement paths without additional mismatch of measurement and vibration canceling paths.

7 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTERFEROMETRIC VIBRATION AND THERMAL EXPANSION COMPENSATOR

STATEMENT OF GOVERNMENT INTEREST

The invention described herein may be manufactured and by or for the Government of the United States of America for Governmental purposes without the payment of any royalties thereon or therefor.

BACKGROUND OF THE INVENTION (1) Field of the Invention

This invention relates to a refractive index variability measuring system and more particularly to a specific configuration which provides an improved method for active structural vibration and thermal expansion cancellation.

(2) Description of the Prior Art

This invention pertains in general to instruments for measurement of refractive index variability in natural waters. Such measurement is necessitated by the existence of refractive index inhomogeneities, or cells of refractive index variability, in the ocean and the like. These cells create acoustical interference phenomena when penetrated by acoustic waves as pointed out by Robert J. Urick in his book: *Principles of Underwater Sound,* 3rd Edition, McGraw-Hill Book Company, 1983 pp. 183–187. Measurements of these cells have applications involving performance of underwater optical systems which rely on the detection of phase changes in communication and imaging systems. General principles for the measurement of refractive index variability for both air and water are known in the field and have heretofore been described in the prior art such as Gibson et al.: "Optical Path Length Fluctuations in the Atmosphere", *Appl. Opt.,* 23,4383–4389 1984; and Buchave et al: "The Measurement of Turbulence with the Laser Doppler Anemometer", *Ann. Rev. Fluid Mech.,* 11,443–503, 1984. The measurement of refractive index fluctuations in air typically involves reflection of two sets of optical beams from plane parallel mirrors, with one set of beams passing through vacuum (thermal expansion and vibration canceling path) and the other set of beams passing through a medium such as air (measurement path). Instruments performing these measurements, are available commercially. For example, the Hewlett-Packard Wavelength Tracker HP1017A, and the measurements of changes in refractive index (dn) attained are described in Zygo Corporation, (Middlefield, Conn. 06455), Application Bulletin, of 22 Dec. 1987, "Optical Wavelength Compensator Description, Installation, and Alignment". Typical applications would be to use such an instrument to make corrections to displacement, velocity or angle measurements caused by fluctuations in the refractive index in the medium.

However, neither the instrumentation nor the methodology for atmospheric measurement of refractive index variability is directly transferable or can be easily modified for use in the ocean. To date differences in size of cells of refractive index variability and diffusion characteristics as well as technical deployment difficulties have hampered attempts to translate instrumentation and methods from the air to a medium such as water. An indirect method presently used is described in "Tow Chain Measurements of Ocean Microstructure", by Stephen A. Mack, J. Phys. *Oceanogra.,* 19,1108–1129, 1989. This method involves chains of microtemperature and microconductivity probes towed through the seawater by a ship. However, indirect methods use approximate equations of state to obtain the refractive index variability leading to inaccuracies, proposals have been made to attempt direct measurements with interferometers that measure optical phase. One such attempt is by Richard C. Honey, "A proposed program to monitor the fine structure and microstructure of the upper layers of the sea", Final Report, Stanford Research Institute Project 1189, Nov. 30, 1971. However, the self noise of the optical devices themselves can create phase changes as well as refractive index variations, with the result that the structural vibrations may dominate the measurements. There is thus a need for canceling the effect of structural vibrations and thermal expansion on measurements of refractive index variability of the medium such as ocean water.

SUMMARY OF THE INVENTION

Accordingly, it is the general purpose and object of the present invention to provide a compensator which corrects for measurements of changes in refractive index of a medium produced by structural vibrations of the measuring device.

Another object of subject invention is to correct measurements of the changes in the refractive index of the medium produced by the thermal expansion of the measuring device.

Still another object of subject invention is to have an optical system which uses a plurality of interferometers to measure accurately changes in the refractive index of the medium.

Yet another object of subject invention is to make a direct measurement of refractive index variability of the medium instead of using an indirect method using approximate equations of state.

These objectives are accomplished with the present invention by providing an interferometric vibration and thermal expansion compensator wherein a light source such as a laser provides two beams of light of two different frequencies and each being polarized in a direction perpendicular to that of the other. The paths of the two beams are so arranged that they are made to interfere in an optical receiver. One of the two optical beams traverses an optical path through the medium experiencing a phase change due to variation of refractive index, structural vibrations and thermal expansions. The polarization of the two optical beams in directions perpendicular to each other is used to filter the two optical beams and they are thus made to travel different optical paths.

BRIEF DESCRIPTION OF THE DRAWINGS

A more complete understanding of the present invention and the attendant advantages therein may be gained from the following specification when read in conjunction with the appended drawings wherein.

DESCRIPTION OF THE PREFERRED EMBODIMENTS

Figure 1:
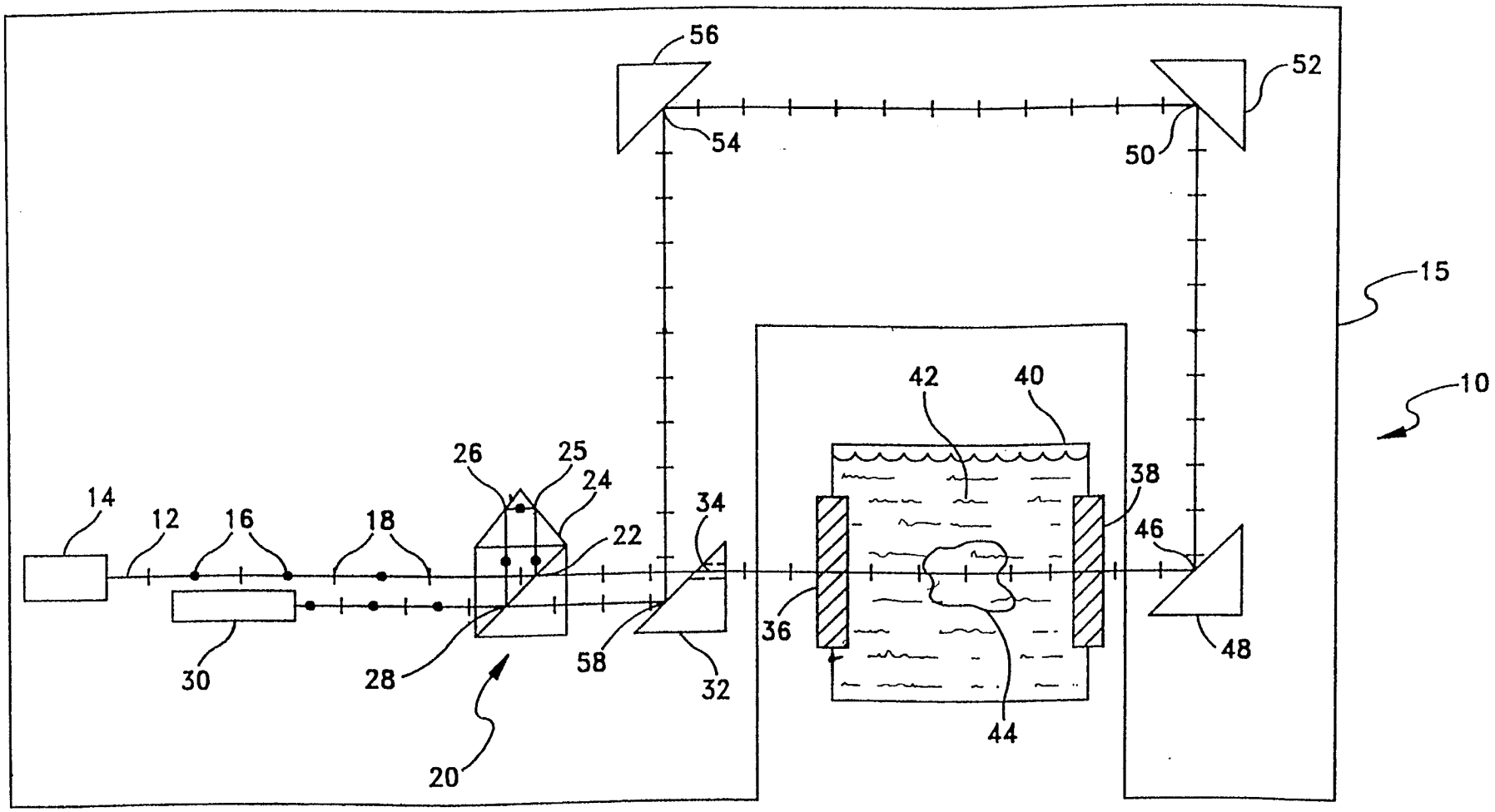
FIG. 1 is a block diagram showing an optical path for a vertically polarized optical beam through the optical windows of a water tank and a horizontally polarized optical beam having an optical path internal to the system within a pressure housing.

FIG. 1 shows a basic Michelson linear interferometer arrangement 10. The technique to be used in this case involves combining of two optical signals in a heterodyne arrangement. A coherent light beam 12 is obtained from a two frequency laser head 14 which consists of two colinear components; one component with horizontal polarization depicted by solid circles such as 16 and the other with vertical polarization represented by vertical lines such as 18 throughout; each polarized component having a slightly different frequency typically 2–20 megahertz (Mhz). This intermediate frequency is much less than the optical frequency of ($5\times10^8$ Mhz) the laser light. The light beam 12 strikes a polarizing beamsplitter 20 which divides the two polarized optical beams with different orientation of polarizations and different frequencies. At point 22 of beamsplitter 20 the horizontally polarized optical beam (designated by dots 16) is reflected while the vertically polarized optical beam (designated by vertical lines 18) is transmitted. The horizontally polarized optical beam is reflected twice at points 25 and 26 of retroreflecting mirror 24 which is attached to the polarizing beamsplitter 20. The retroreflector (corner cube mirror) 24, has the property that any beam hitting it will return along a displaced path parallel to the direction of the incident beam. Consequently, the horizontally polarized beam returns to the beamsplitter 20 at point 28 parallel to its incident path but slightly displaced path. It gets reflected at 28 and is received by receiver 30. The vertically polarized beam, designated by vertical lines 18 is transmitted through a beam reflector 32 through opening or notch 34 therein and is then transmitted through optical windows 36 and 38 of tank 40 filled with the medium 42 (water) and passes through a refractive index variability cell 44. This beam is then reflected at point 46 of mirror 48, reflected again at respective points 50 and 54 of right angle reflectors 52 and 56. This beam then gets reflected at point 58 of mirror 32 and is mixed with the horizontally polarized beam in receiver 30 after being transmitted through beamsplitter 20. The two optical beams then interfere with one another in receiver 30. Any changes in the refractive index due to the transmission through the medium (water) of the vertically polarized optical beam are measured from the interference pattern, assuming that there are not structural vibration and thermal expansions in the optical system. It is to be noted that one of the optical beams (horizontally polarized) follows an internal (i.e., an optical path inside a pressure housing 15 in which all optical components are put together) path while the other optical beam (vertically polarized) mostly follows an internal path inside the housing 15 except it goes through the water cell. It is to be noted that the pressure housing in each of the five figures houses all the optical components and is shown by numerals 15, 61 and 101 in FIGS. 1, 2 and 3, respectively. It is left out in FIGS. 4 and 5 to preserve clarity of the figures. It is also to be noted that the pressure housing is pressurized with an inert gas such as nitrogen to preserve the integrity of the optical components by keeping out moisture, etc. Furthermore, the packaging in pressure housing are such that the various interferometers used are very close to one another particularly in FIGS. 4 and 5. Besides the retroreflector on the optical windows of the water tank are mounted so as to minimize the optical path for the beams outside the pressure housing.

Figure 2:
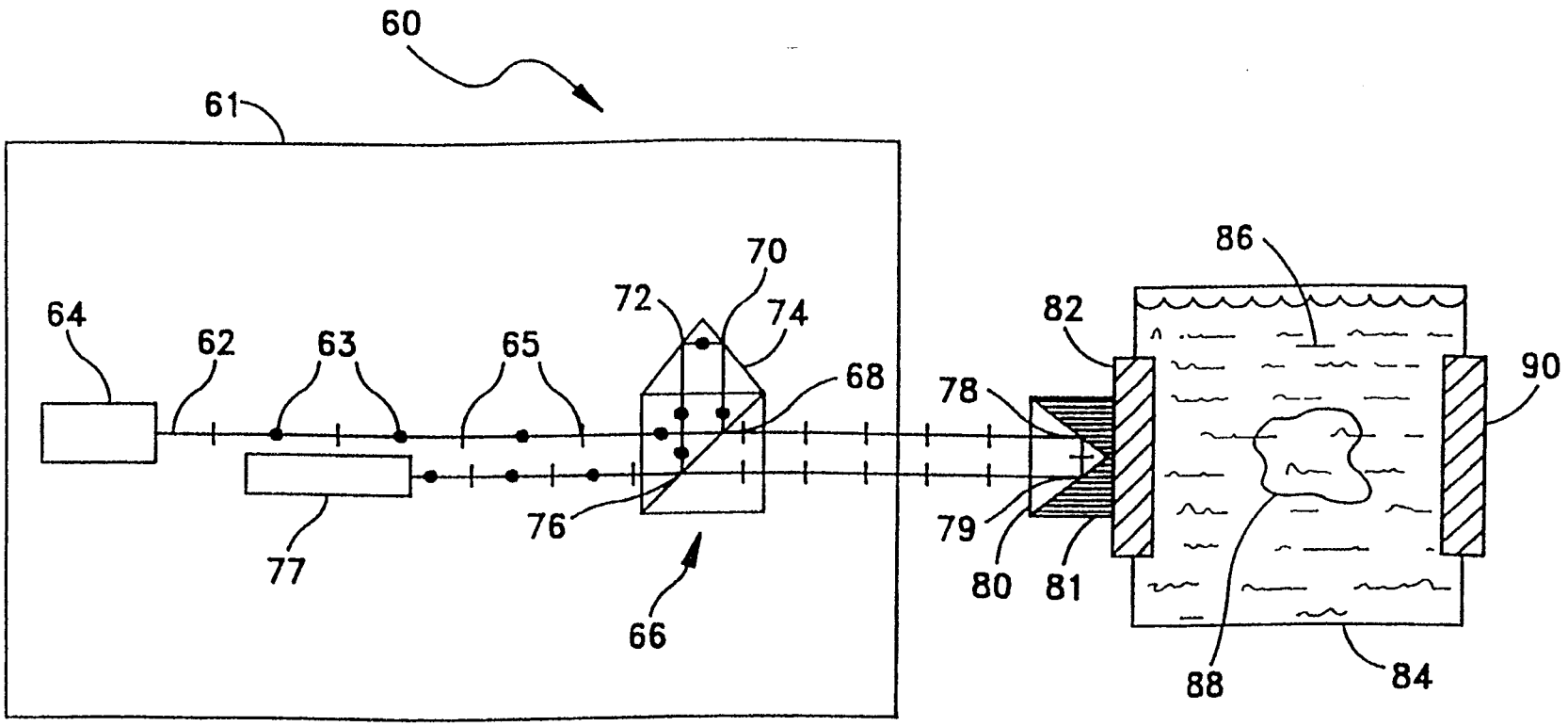
FIG. 2 shows a vibration canceling optical path which measures vibrations at the window of a water tank, all optical path being internal to the system inside the pressure housing.

FIG. 2 diagrammatically illustrates a setup which is similar to that of FIG. 1 where the pressure housing is designated by 61. The objective is to measure the vibrations of optical window 82 as it affects the optical path as the vibrations transferred to the pressure housing. As in FIG. 1, a coherent optical beam 62 is obtained from a two-frequency laser head 64 with horizontally polarized optical beam component designed by dots 63 and vertically polarized optical beam component designated by vertical lines 65. The horizontally polarized component is reflected at 68 of beamsplitter 66 and after encountering reflections at 70 and 72 of cube corner mirror 74 is again reflected at point 76 of beamsplitter 66 and is received by receiver 77. The vertically polarized component of the optical beam is transmitted through beamsplitter 66 and is reflected at points 78 and 79 of the retroreflector 80 which is mounted using mounting means 81 (e.g., as a glue) on optical window 82 which is a part of tank 84 filled with water medium 86 having refractive index variability cells such as 88. The water tank has also another optical window 90. It should be noted that each of optical receivers 30 and 77 includes a photodiode which responds to the sinusoidally changing light intensity. The frequency of the modulation is the difference frequency between the two orthogonally polarized components of the beam. The frequency of the laser light is changing too rapidly for the photodetector to respond so that only the difference frequency is detected. If the retroreflector 80, moves with respect to the fixed retroreflector 74, the difference frequency is Doppler shifted so that the modulation sensed by the photodiode in the receiver 77 changes. The change in the difference frequency is directly proportional to the velocity or phase rate of the moving retroreflector 80. The optical path change is obtained by integrating the velocity over a measurement cycle. This can be done with the use of phase detection electronics well known in the prior art as described in Zygo Axiom 2/20 Laser Measurement System Service Manual SP-0085, Nov. 1988. The optical path change is directly related to the index of refraction and the displacement. The measurements obtained are digitized and stored by a computer. The measurement signals from the optical receivers are combined with a reference signal from the laser head and integrated to obtain phase change information. The measurement process occurs at MHz frequencies so that displacement and refractive index change data is sampled extremely rapidly. The sampling of the adjacent paths is assumed to be nearly simultaneous. The sampling is at a rate such that the dissipation and movement of the refractive index variability cells in the medium during the period between samples is negligible. Time series of the data from each receiver are sampled and stored in computer memory. Spectral analysis of the data from paths internal to the system reveal the frequencies at which structural vibrations are occurring within the instrument. Low frequency effects associated with thermal expansion would also be identified by examination of the time series of the compensating paths.

Calibration of the instrument is accomplished by placing the instrument in a temperature controlled container in which the refractive index effects are made negligible. The structure (pressure vessel) containing the optical components could then be excited by mechanical shakers or by introducing a flow in the container. Iterative combinations of subtracting the vibration canceling paths with appropriate scaling factors from the measurement paths would determine the spectral sensitivity of the apparatus.

After calibration the instrument would be placed in the medium of interest with microtemperature and microconductivity probes along with a current meter near the measurement path. The presence of refractive index variability cells moving through the optical measurement paths would be confirmed by a correlation between adjacent parallel paths.

It must be remembered that the effect to be measured can be quite small, even close to the resolution of the interferometers. This is contrasted with laboratory measurements where the effect of the refractive index variability cells can be made arbitrarily large with respect to other effects. Subject devices provide a means of compensating for the structural vibrations and thermal effects by use of a geometry which permits path matching and at the same time does not disrupt the flow which could break up the refractive index cells.

Figure 3:
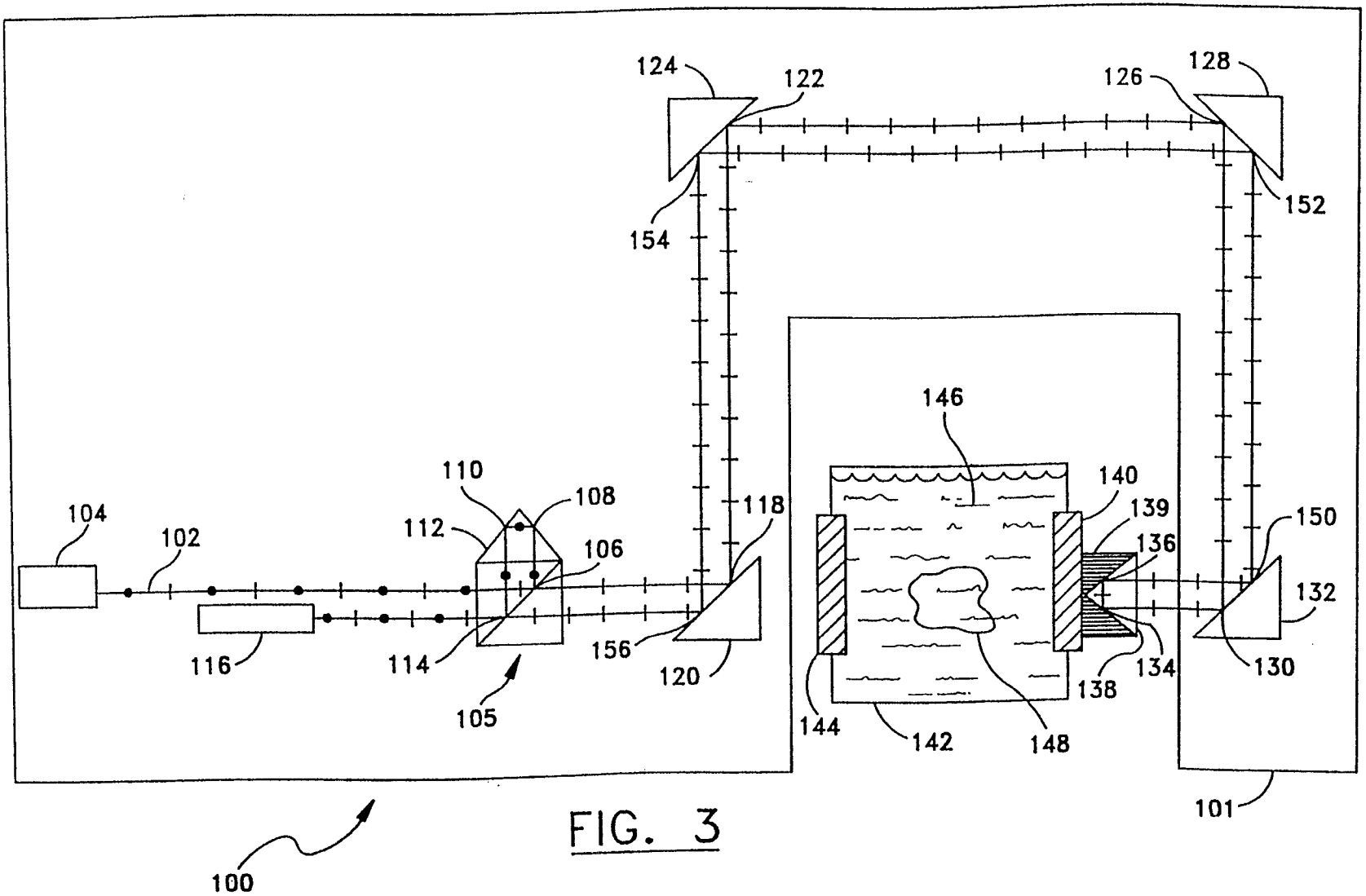
FIG. 3 is similar to FIG. 2 where the vibrations are measured at another optical window of the water tank.

FIG. 3 shows window vibration cancellation due to the window path which is almost C-shaped. The purpose for this is to match the path internal to the pressure housing of FIG. 1 and at the same time stay away from the measurement path so that the refractive index variability cells are undisturbed. As shown in FIG. 3 a coherent light beam 102 is obtained from a two-frequency laser head 104 and thus having a horizontally polarized beam designated by dots and vertically polarized beam represented by vertical lines as shown in FIGS. 1 and 2. The optical beam strikes the polarizing beamsplitter 105 at 106 dividing the horizontally and vertically polarized components of the beam. The horizontally polarized component of the beam is divided by the beamsplitter 105 at 106, then reflected twice at points 108 and 110 of retroreflector 112, reflected again at 114 of beamsplitter 105 and then goes to receiver 116. The transmitted vertically polarized component of the beam is reflected at point 118 of right angle mirror 120, reflected again at point 122 of mirror 124, then reflected at point 126 of right angle mirror 128, and reflected again at point 130 of right angle mirror 132. This vertically polarized component of the beam is then reflected at points 134 and 136 of a retroreflecting mirror 138 which is secured by mounting means 139 to optical window 140 which is part of water tank 142 having also optical window 144. Tank 142 contains water medium 146 which has refractive index cells such as 148. The vertically polarized component of the beam reflected twice by the retroreflector 138 returns by way of the four respective right angle mirrors 132, 128, 124 and 120 after reflections at respective points 150, 152, 154 and 156 and then back to the beamsplitter 105 at 114, this optical beam changing direction by ninety degrees at each reflection and is then recombined with the horizontally polarized beam in receiver 116. The right angle mirrors 120, 124, 128 and 130 in FIG. 3 must be larger than those in FIG. 1 because the beam must reflect twice at each of these right angle mirrors. They will henceforth be referred to as large right angle mirrors in FIGS. 4 and 5. The two optical beam components (horizontally and vertically polarized) interfere at the optical receiver 116. The purpose of the arrangement described in FIG. 3 is to measure the vibrations of the far optical window 140 and the effects due to structural vibrations and thermal effects along the internal path inside the pressure housing. What makes this a difficult problem is that the structure must be stiff to reduce structural vibrations but should not disturb the flow which would break up the refractive index cells.

Figure 4:
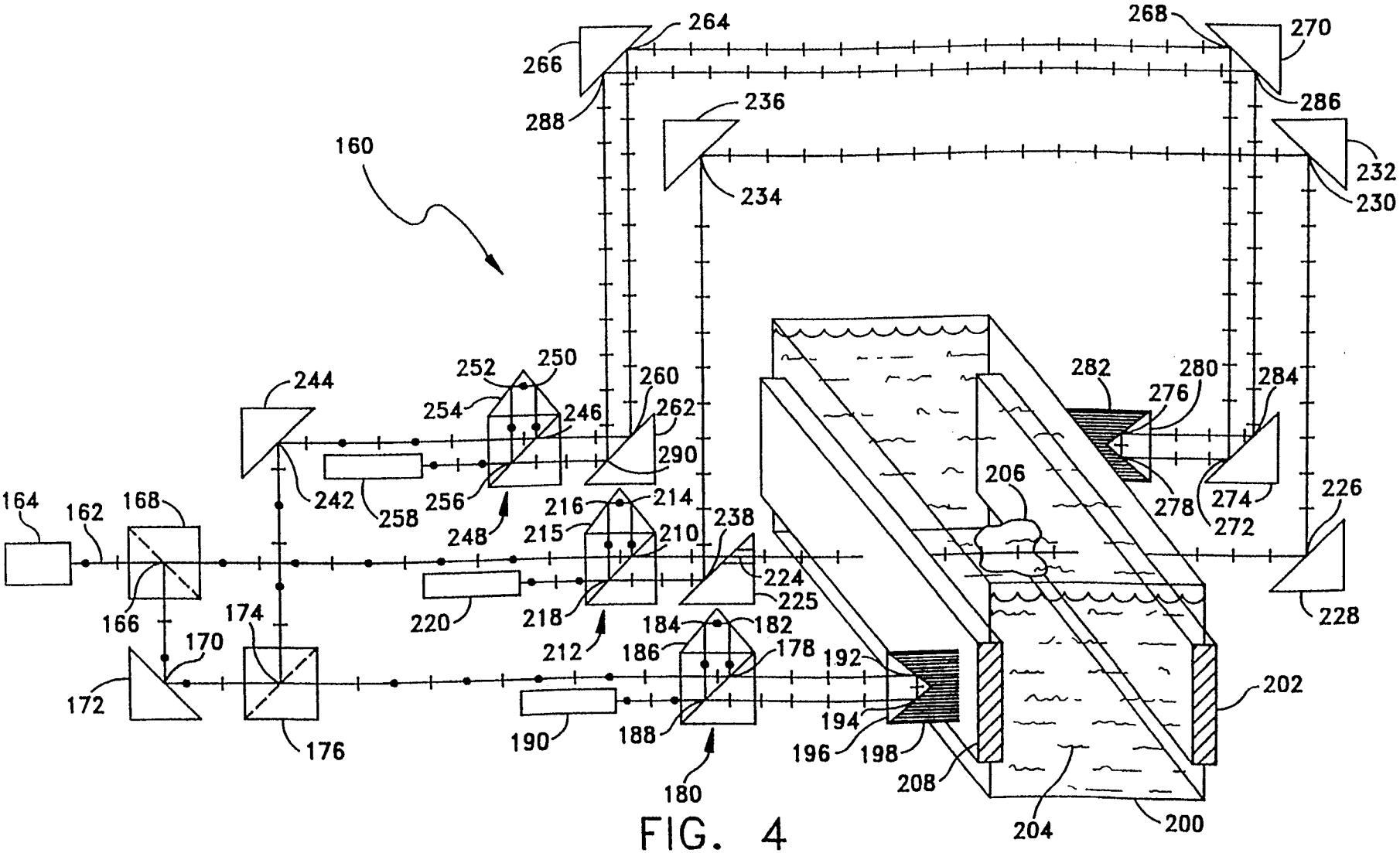
FIG. 4 is a block diagram of a device built according to the teachings of subject invention.

FIG. 4 shows a refractive index variability instrument that is configured to make very sensitive vibration measurements with a single water measurement path. By subtracting the vibration cancellation paths from the measurement paths it is possible to determine which fluctuations occur only in the water path. Because of the instruments unique geometry we have overcome the problem of canceling vibrations without blocking water flow. As before a two-frequency optical beam 162 is obtained from laser 164 head. Beam 162 strikes at point 166 of a non-polarizing beamsplitter which transmits approximately two thirds of the incident optical power and reflects one third. Both horizontally and vertically polarized components are present in the transmitted and reflected parts after beamsplitter 168.

The reflected part at point 166 of non-polarizing beamsplitter 168 including both horizontally polarized and vertically polarized components is reflected at point 170 of right angle reflector 172 which then reaches point 174 of a non-polarizing beamsplitter 176. It should be noted that the non-polarizing beamsplitters 168 and 176 are represented by square blocks with a dashed diagonal line indicating that they are non-polarized beamsplitters while the polarizing beamsplitters will be designated by square blocks each with a solid diagonal line. The transmitted part of the beam at point 174 of beamsplitter 176 includes both the horizontally polarized and vertically polarized components or portions of the optical beam which reaches point 178 of polarizing beamsplitter 180. The horizontally polarized portion of this optical beam is reflected twice at points 182 and 184 of mirror 186 which is then reflected at point 188 of the beamsplitter 180 and then reaches receiver 190. The transmitted portion of the optical beam through the beamsplitter 180 is then reflected at points 192 and 194 of reflector or mirror 196 which, using mounting means, 198 is attached to window 208 which is a part of water tank 200 having another optical window 202. Tank 200 is filled with water 204 having refractive index variability cells such as 206 which provides a path for one of the optical beams as shown. The optical beam reflected at point 194 has only the vertically polarized components. It returns to the beamsplitter 180 and recombines with the horizontally polarized portion of the beam in receiver 190.

The portion of the optical beam which is transmitted by beamsplitter 168 includes both horizontally polarized and vertically polarized components and falls at point 210 of polarizing beamsplitter 212. The horizontally polarized portion of this beam is reflected at points 214 and 216 of reflector 215 and reaches point 218 of beamsplitter 212 and after reflection at point 218 is received by receiver 220. The transmitted portion of the beam falling at point 210 is only vertically polarized and it passes through an opening or notch 224 in reflector 225. This beam then passes through optical window 208, refractive index variability cells such as 206 and through the optical window 202 and then falls at point 226 of the right angle reflector 228. The beam reflected at 226 is then reflected at 230 of reflector 232, reflected again at 234 of reflector 236. This beam then falls on reflector 225 at point 238 where it is reflected. It then passes through point 218 of beamsplitter 212 and is recombined with the horizontally polarized beam in receiver 220.

The optical beam reflected at point 174 of the non-polarizing beamsplitter 176 includes both horizontally polarized and vertically polarized components and is reflected at point 242 of a right angle reflector 244. This beam then reaches point 246 of polarizing beamsplitter 248. The horizontally polarized component of this optical beam is reflected at points 250 and 252 of reflector 254 and then after reflection at point 256 of beamsplitter 248 is received by receiver 258. The transmitted portion of this beam which is only vertically polarized is then reflected at point 260 of right angle mirror 262, again reflected at point 264 of reflector 266, is then reflected at point 268 of reflector 270 and is reflected again at point 272 of reflector 274. The beam reflected at point 272 is then reflected twice at respective points 278 and 276 of retroreflector 280 which is attached to optical window 202 of water tank 200 by using mounting 282. This beam is then reflected at point 284 of reflector 274. Thereafter, the beam is reflected at point 286 of reflector 270, reflected at 288 of reflector 266 and reflected again at point 290 of reflector 262. The beam then passes through point 256 of the beamsplitter 248 and is then recombined with the horizontally polarized beam in receiver 258. Since the optical power in the beam decreases exponentially in water, most of the optical power is put through the measurement path in the water medium. In the present case, two thirds of the optical power minus appropriate losses is directed to optical receiver 220 and one sixth the optical power minus appropriate losses to optical receivers 258 and 190. The three optical receivers 258, 220 and 190 perform measurements in parallel. The noise effects measured in the optical receivers 258 and 190 are subtracted from optical receiver 220 to obtain the changes in the refractive index in the medium (water). Alternately, two (six interferometers) or more of the configuration shown in FIG. 4 could be sandwiched together in the pressure housing for the purpose of obtaining additional water paths to see if the movement of the refractive cells can be correlated between measurement paths assuming the cells are advected through the measurement region, providing a method of identifying the refractive index structure. This sandwiching arrangement provides a unique way to add additional water paths for correlation studies without degrading the vibration compensation.

Figure 5:
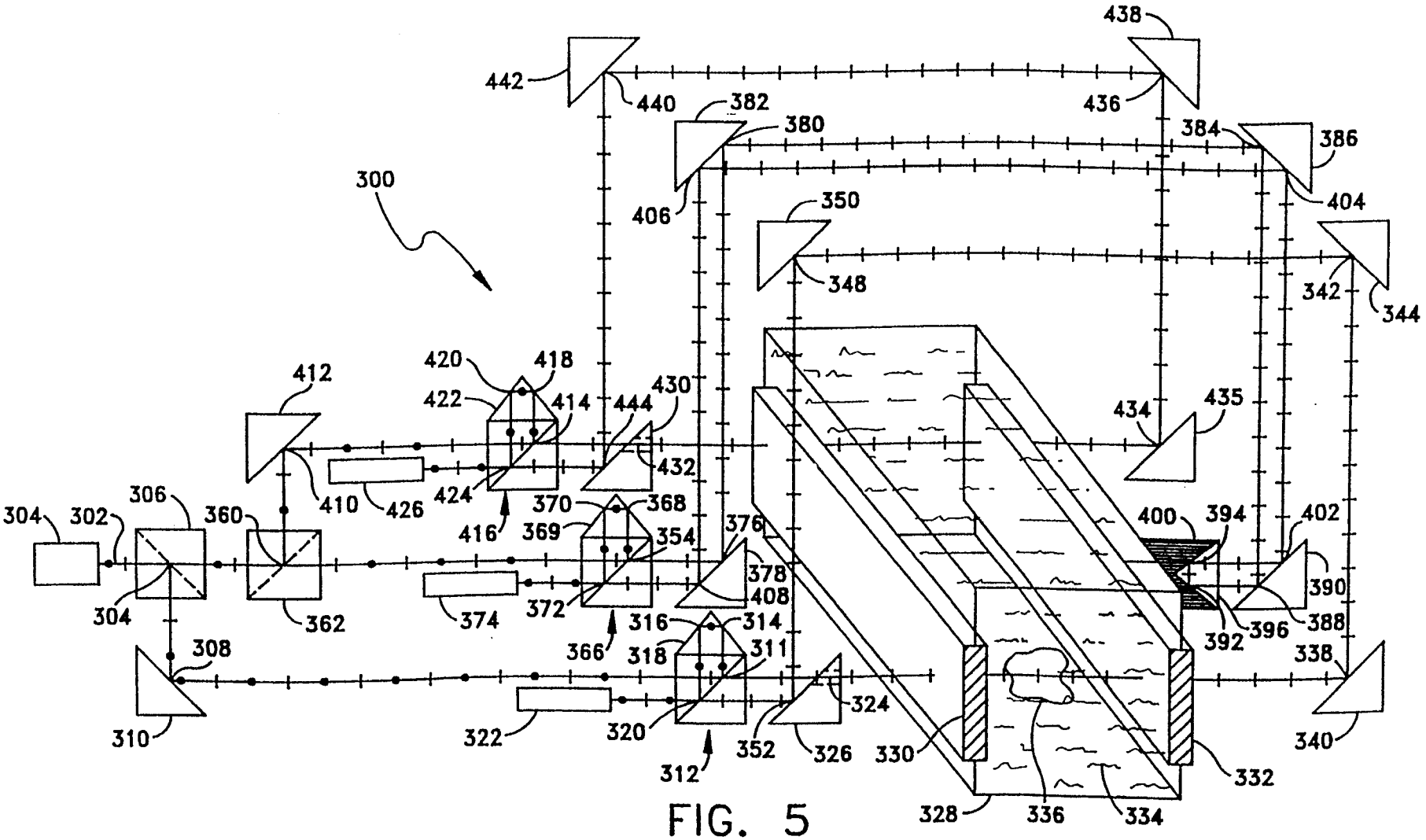
FIG. 5 shows another embodiment of subject invention.

An alternate configuration 300 of a refractive index variability instrument that we have invented is shown in FIG. 5. In this configuration a two-frequency optical beam 302 emitted by laser head 304 with horizontally polarized and vertically components indicated by solid circles or dots and by vertical lines respectively which strike the non-polarizing beamsplitter 306. At the non-polarizing beamsplitter 306 the reflected beam with one third of the incident laser power and having both horizontally and vertically polarized components strikes at point 308 mirror 310. This light beam then strikes at point 311 of a polarizing beamsplitter 312 where the horizontally polarized and vertically polarized components are split so that the vertically polarized component is transmitted while the horizontally polarized component is reflected. The vertically polarized component passes is transmitted from the beamsplitter 312 undeviated through a notch 324 cut in a right angle mirror 326 and through an optical window 330, then into the water medium 334 where it may penetrate refractive index variability cells such as 336, and back into the pressure housing through the optical window 332. From the optical window 332 the vertically polarized beam strikes at point 338 of a right angle mirror 340 being deviated by ninety degrees to the left hence striking at 342 of another right angle mirror 344 being again deviated by ninety degrees to the left, getting reflected again at a point 348 of a right a right angle mirror 350 again being deviated by ninety degrees to the left and then striking at point 352 of right angle mirror 326 below the notch 324 and then being deflected to the right and passing through points 320 of the polarizing beamsplitter 312. The horizontally polarized component which is reflected at point 311 from the beamsplitter 312 then is reflected twice at points 314 and 316 of an attached retroreflecting mirror 318 and is recombined at the polarizing beamsplitter 312 with the vertical polarized component. The two frequency beam from beamsplitter 312 then enters the optical receiver 322 where the two polarized components are allowed to interfere. The signal from this receiver can be used to measured refractive index variability along the measurement path between the optical windows 330 and 332. The light beam transmitted by non-polarizing beamsplitter 306 which contains two thirds of the incident laser optical power strikes at point 360 of a non-polarizing beamsplitter 362 with transmitted and reflected beams each having one third of the incident laser power. Part of this beam is transmitted by beamsplitter 362 which then strikes at point 354 polarizing beamsplitter 366 where the vertically polarized component is transmitted and the horizontally polarized component is reflected. The vertically polarized component after being transmitted by polarizing beamsplitter 366 strikes at point 376 of a large right angle mirror 378 where the beam is deviated by ninety degrees to the left, then striking at point 380 of another large right angle mirror 382 being again deviated by ninety degrees to the right, then traveling striking at point 384 of another large right angle mirror 386 being deviated ninety degrees to the right, thence to point 388 of another large right angle mirror 390 again being deviated by ninety degrees to the right. From the large right angle mirror 390 the vertically polarized beam gets deflected twice at points 392 and 394 of a retroreflector 396 attached to the optical window 332 by a mounting 400. After reflected twice at retroreflecting mirror 396 the light beam is then reflected at point 402 of the large right angle mirror 390 being deviated by ninety degrees to the left, then getting reflected to point 404 of large right angle mirror 386 being deviated by ninety degrees to the left, hence again getting reflected to point 406 of the large right angle mirror 382, again being deviated by ninety degrees to the left hence going again to point 408 of the large right angle mirror 378 being deviated by ninety degrees to the right and to point 372 of the beamsplitter 366. The horizontally polarized beam reflected at 354 from beamsplitter 366 and is reflected twice at points 368 and 370 of the attached retroreflector 369 and is returned parallel but slightly displaced to point 372 of the polarizing beamsplitter 366. From the polarizing beamsplitter 366 the recombined horizontally and vertically polarized components of the beam enter the optical receiver 374 where they are allowed to interfere. The interference signal in optical receiver 374 contains information about the vibrations of the far window 332 and the thermal expansion effects and structural vibrations along the path traveled by the horizontally polarized beam. From beamsplitter 362 the reflected beam which has horizontally and vertically polarized components strikes at point 410 the right angle mirror 412 where it is deflected ninety degrees to the right and hence to the point 414 of the polarizing beamsplitter 416. At the beamsplitter 416, the horizontally polarized and the vertically polarized components are divided at point 414 with the horizontally polarized component being reflected and the vertically polarized component being transmitted. From the beamsplitter 416 the transmitted vertically polarized component passes undeviated through a notch 432 cut in a right angle mirror 430 hence through an optical window 330 and into a water medium containing refractive index variability cells such as 336 in water tank 328 which has another optical window 332. The vertically polarized beam reenters the pressure housing through optical window 332, then strikes at 434 of a right angle mirror 435 being deviated by ninety degrees to the left, thence striking at point 436 of a right angle mirror 438 again being deviated by ninety degrees to the left, thence striking at point 440 of a right angle mirror 442 again being deviated by ninety degrees to the left and striking at point 444 of right angle mirror 430 below the notch 432, then being deviated by ninety degrees to the right and striking at point 424 of the polarizing beamsplitter 416. The reflected horizontally polarized beam from the polarizing beamsplitter 416 reflects twice at points 418 and 420 of the attached retroreflector 422 returning by a path parallel but slightly displaced to point 424 of the polarizing beamsplitter 416 where the two beams (horizontally polarized and vertically polarized beam) are recombined. The combined beam from the beamsplitter 416 enters the optical receiver 426 where the interference signal is produced. The signal from the optical receiver 426 contains information about the refractive index variability in a measurement path between the optical windows 330 and 332.

The primary difference between FIG. 5 and FIG. 4 is that it has two water measurement paths in a three interferometer configuration. This invention would allow more paths to be used to track the movement of the refractive index variability cells for the given number of interferometers. The vibration compensation is somewhat less precise here than in FIG. 4 so that it might be necessary to make the structure containing the optics much more rigid on the near side optical window 330 as opposed to the far side optical windows 332. As before, various optical beamsplitters and reflectors can be sandwiched together in a pressure housing to obtain additional water measurement paths. Trade offs between available laser power, water clarity, desired sampling rates, and refractive index variability cell size would dictate the optimum configuration.

FIGS. 4 and 5 contain details of the geometry for the embodiments of the invention described. The basic idea is that when light is traveling through a medium with a time changing refractive index (refractive index variability cells flowing through the measurement path), it will undergo changes in wavelength so that the number of light cycles in the optical path changes producing a phase change. Movement of optical components due to vibration and thermal expansion also produce phase changes. The device of subject invention corrects the measurements to more closely obtain the signal due to refractive index effects.

FIG. 4 contains a single measurement path and two vibration/thermal expansion compensating paths. The device in FIG. 4 works by measurements of phase changes in the measurement path. The phase changes contain information about the refractive index changes in the medium and vibration/thermal expansion effects in the pressure housing. The compensation paths contain only information about vibration and thermal expansion effects. A linear combination of the phase changes from the three receivers permits the phase changes due to refractive index changes in the medium to be extracted from unwanted phase changes due to other effects. By including two compensation paths which include mirrors mounted on both optical windows we can obtain a better correction for vibrations of the windows. Once phase changes due to vibration and thermal expansion are removed, the effect remaining is the change in the phase due to the refractive index cells.

As pointed out earlier, the device of FIG. 5 does not measure the vibrations as carefully but provides an additional path in the test medium (water) that can be used to correlate the movement of the refractive index variability cells and confirms that the device measures the advection of the cells with the medium current. FIG. 4 includes at least one internal path which permits identification of the frequency spectrum of effects unrelated to refractive changes in the medium. If the window which does not have an attached retroreflector is sufficiently stiff a linear combination of the compensating path with either measurement path will allow reduction of phase changes due to undesired effects.

The devices described herein could be constructed with commercially available components such as the Axiom 2/20 laser measurement system manufactured by Zygo Corporation or the Hewlett-Packard laser position transducer system HP 5527A with preference to the Axiom 2/20 system. The He-Ne laser head Model 7701 provides a two-frequency beam with an 20 MHz split. The optical power in the laser beam can be divided in $\frac{1}{3}$ and $\frac{2}{3}$ beams by beamsplitter Model 7000 and in $\frac{1}{2}$ and $\frac{1}{2}$ combinations with beamsplitter 7001. The Michelson linear interferometers Model 7002 allow the two frequencies to be split and recombined. The mirrors 7007 and mirrors 7007A with notch permit the beam to be folded by ninety degrees. The large fold mirrors Model 7009 equivalent to that described allow two reflections at each mirror. The retroreflectors used to measure the window vibrations and are equivalent to Model 7003. The optical receivers Model 7080 together with the power supply Model 7045 and Coupler Model 7040 are preferably used to obtain the phase change time series. A computer is required to be used as an instrument control and to store data on disk. A Hewlett-Packard HP 9000 work station with HPIB cable could be used for this purpose.

While we have shown and described certain embodiments of our invention, it is to be understood that it is capable of additional modifications. Changes, therefore, in the construction and arrangement of the basic building blocks can be made without departing from the spirit and scope of the invention as disclosed in the appended claims.

What is claimed is:

1. An interferometric vibration and thermal expansion compensator for a system to study changes in the refractive index of a medium in a test tank full of the medium using a two-frequency orthogonally polarized laser beam having a first horizontally polarized component and a second vertically polarized component, said compensator comprises:

means for allowing second vertically polarized component of said laser beam to pass through the medium in said tank;

means for providing different optical paths for the first horizontally polarized component and the second vertically polarized component of said two-frequency and orthogonally polarized laser beam;

means for recombining the first horizontally polarized component and the second vertically polarized component of said two-frequency and orthogonally polarized laser beam so as to cause interference; and means for subtracting the changes in the refractive index measurements resulting from vibration and thermal expansion effects.

2. The compensator of claim 1 wherein the means for allowing the second vertically polarized component of said two-frequency and orthogonally polarized beam to pass through the medium includes at least a pair of optical windows, a first one for the incoming and a second one for outgoing of the vertically polarized component of said laser beam through the medium.

3. The compensator of claim 2 wherein said means for providing different optical paths includes a first beamsplitters-reflectors-receiver arrangement for said two components of said two-frequency and orthogonally polarized laser beam to be allowed to interfere after reflection at the first of said pair of optical windows of the tank.

4. The compensator of claim 3 wherein said means for providing different optical paths includes a second beamsplitters reflectors-receiver arrangement for the two polarized components of said two-frequency, orthogonally polarized laser beam to be allowed to interfere after reflection at the second of said pair of optical windows of the tank.

5. The compensator of claim 4 which includes at least a third beamsplitters-reflectors-receiver arrangement for the two components of said two-frequency orthogonally polarized laser beam to be allowed to interfere after traveling of the two components of said laser beam through the medium in the tank.

6. The compensator of claim 5 wherein said medium is water.

7. The compensator of claim 6 wherein said tank is configured to use ocean water as the medium.

* * * * *